United States Patent [19]
Katz et al.

[11] Patent Number: 5,456,395
[45] Date of Patent: Oct. 10, 1995

[54] VEHICLE BAGGAGE CARRIER

[76] Inventors: Michael Katz, 76 Bathgate Str., St. Island, N.Y. 10312; Mikhail E. Tsipov, 30-26 Brighton 14 St., Brooklyn, N.Y. 11235

[21] Appl. No.: 30,918

[22] Filed: Mar. 15, 1993

[51] Int. Cl.[6] ............................................. B60R 9/045
[52] U.S. Cl. ................................................... 224/314
[58] Field of Search ............................ 224/314, 329, 224/318

[56] References Cited

U.S. PATENT DOCUMENTS

| | | | |
|---|---|---|---|
| 2,387,779 | 10/1945 | Strauss | 224/314 |
| 2,753,095 | 7/1956 | Barassi et al. | 224/314 |
| 4,483,471 | 11/1984 | Prosen | 224/314 |
| 4,641,769 | 2/1987 | Ten Angel | 224/314 |
| 5,009,337 | 4/1991 | Bimbi | 224/314 X |

Primary Examiner—Renee S. Luebke
Attorney, Agent, or Firm—Ilya Zborovsky

[57] ABSTRACT

A baggage carrier for a car roof comprises a supporting element extending in one plane and including a plurality of supporting members, a plurality of supports arranged to be located after the supporting element so as to support the supporting element on a car roof, and a unit for fixing the supporting element on a car body, the supporting element being collapsible in the plane so as to assume in at least one direction and dimension which is substantially smaller than an original dimension of the supporting element in the same direction.

7 Claims, 3 Drawing Sheets

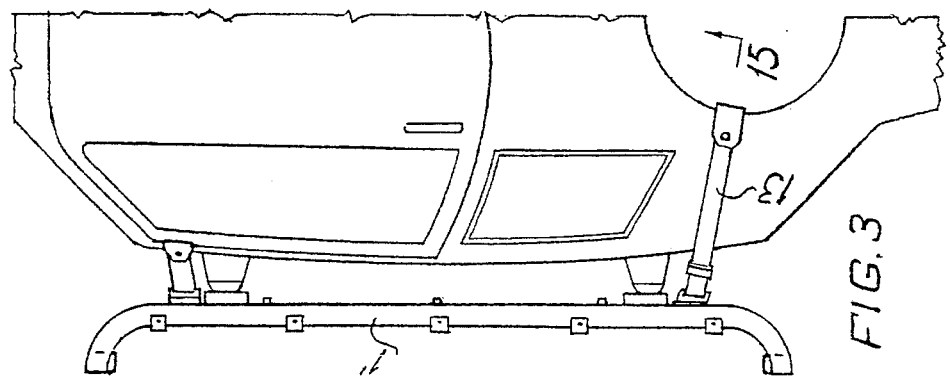
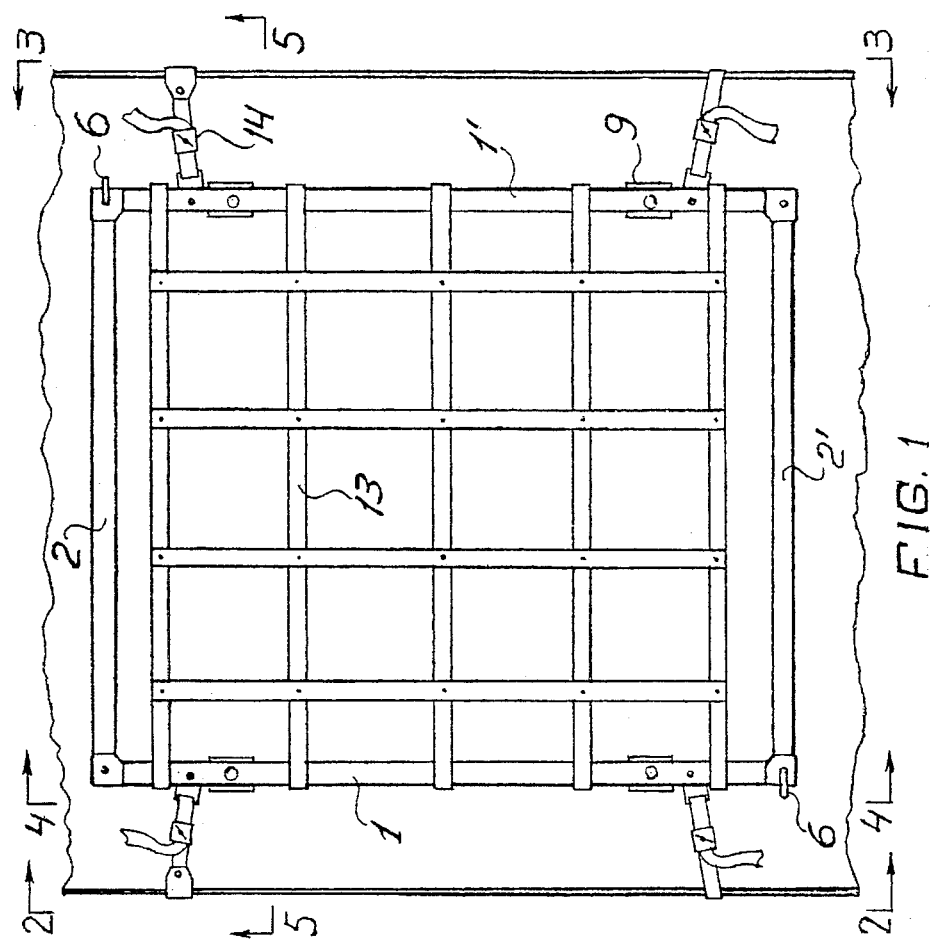
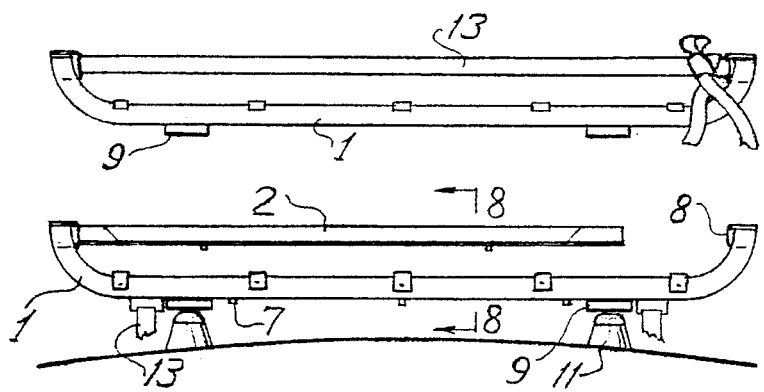
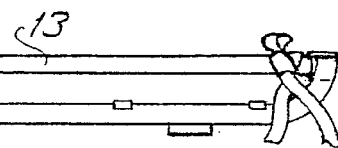

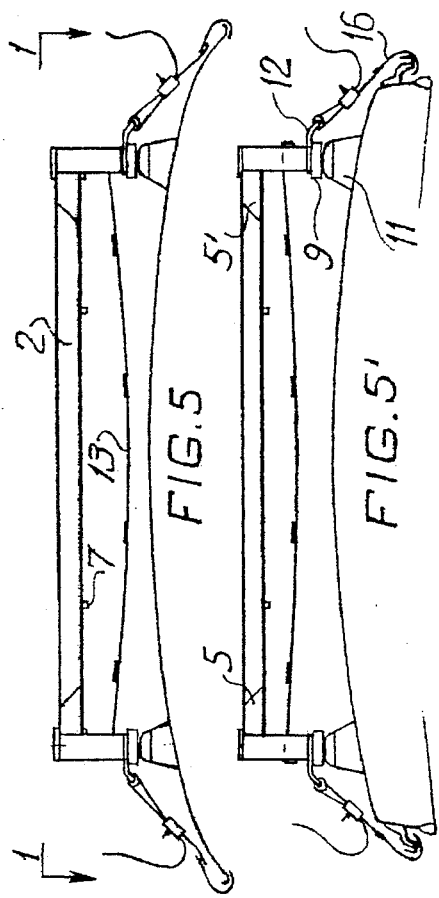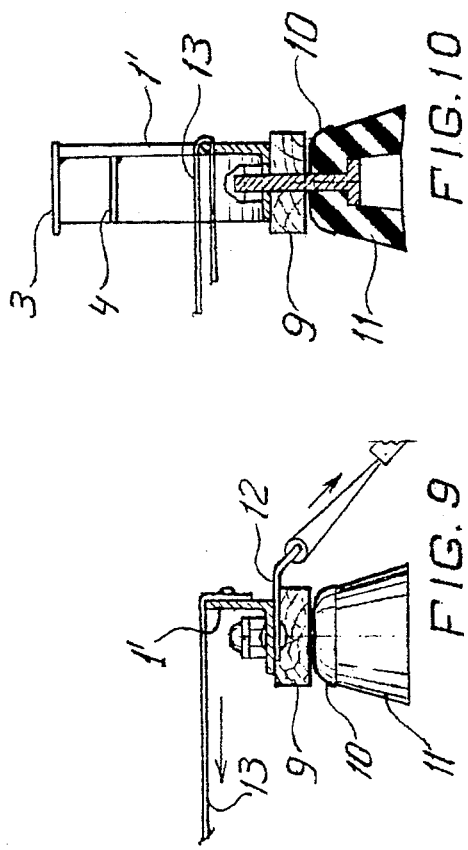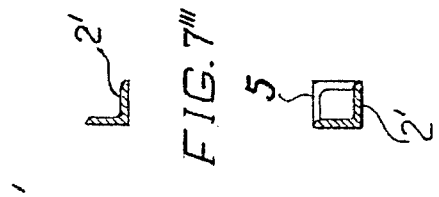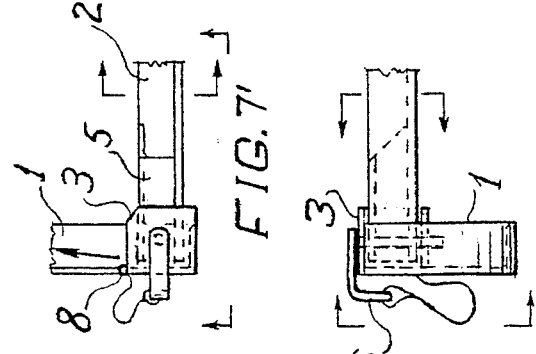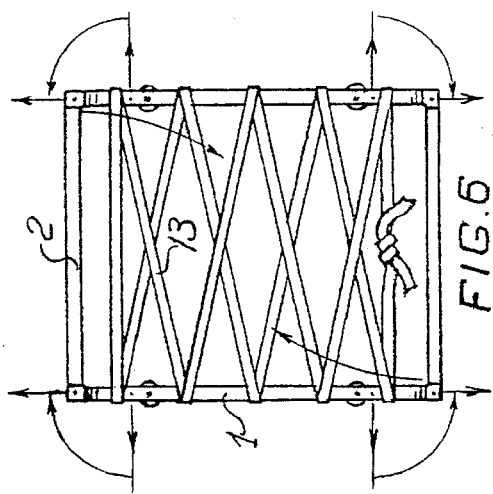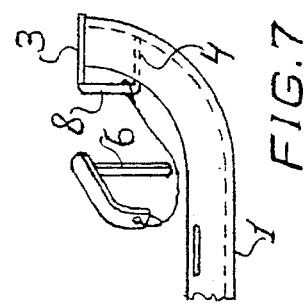

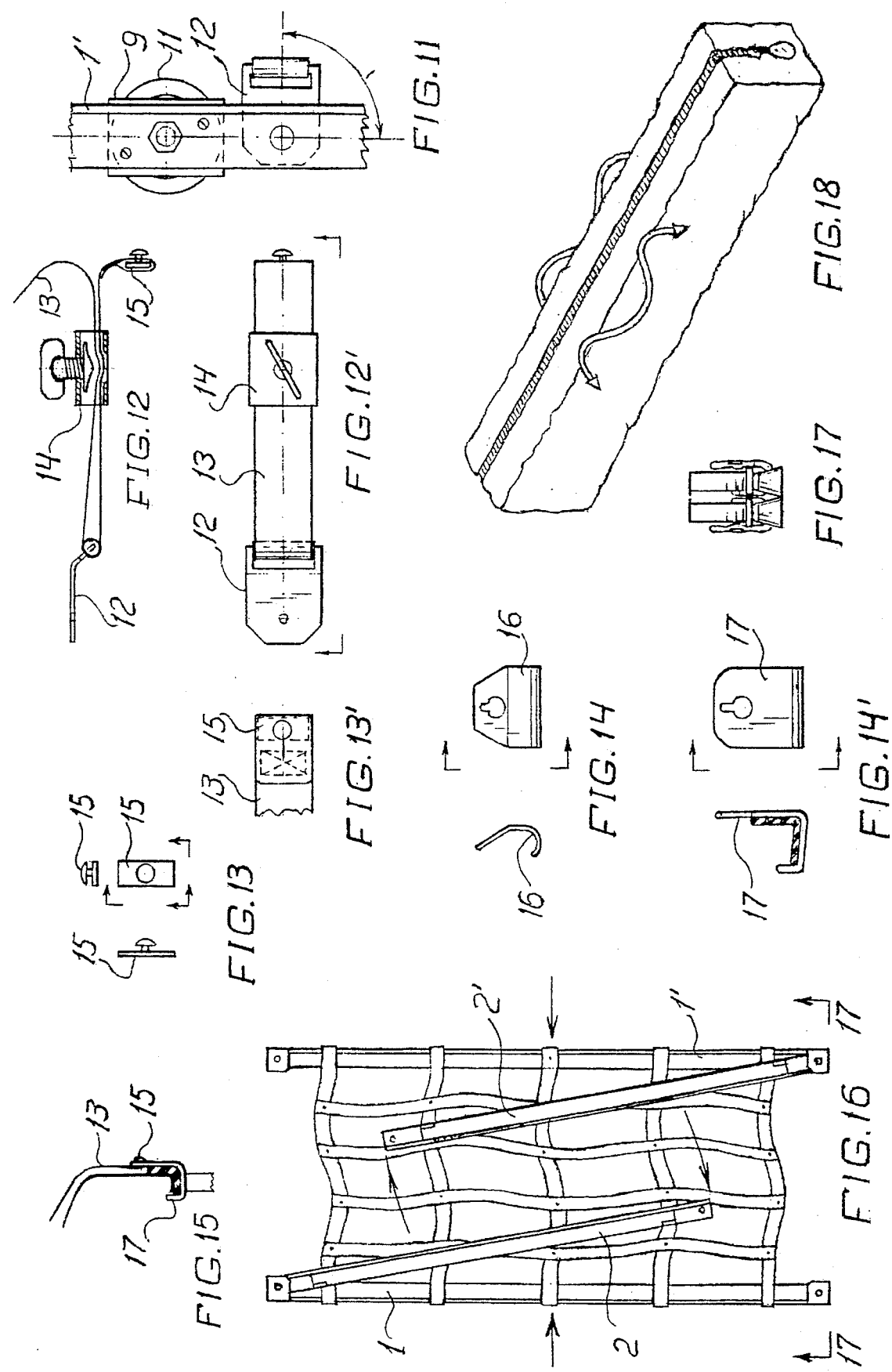

VEHICLE BAGGAGE CARRIER

BACKGROUND OF THE INVENTION

The present invention relates to a vehicle baggage carrier.

Baggage carriers for mounting on the roof of cars are known in the art. A known baggage carrier is a rigid, bulky structure which is useable only for the time of transportation of the baggage. If such a baggage carrier is retained on the roof of the car, it affects its appearance and is aesthetically unacceptable. During movement of a car such a baggage carrier generates aerodynamic noise and reduces gasoline consumption. When such a baggage carrier is removed from the vehicle roof, it needs a special place for storage. This causes significant difficulties in conditions of big cities and especially during open parking and storage of the vehicles.

SUMMARY OF THE INVENTION

Accordingly, it is an object of the present invention to provide a vehicle baggage carrier which avoids the disadvantages of the prior art.

In keeping with these objects and with others which will become apparent hereinafter, one feature of the present invention resides, briefly stated, in a vehicle baggage carrier which has a supporting element formed to extend in a horizontal plane after mounting on a vehicle roof and means releasably connecting the supporting element to the vehicle roof, wherein the supporting element is collapsible in its plane so as to significantly reduce its size in said plane.

When the baggage carrier is designed in accordance with the present invention, it can be collapsed and stored in a case fittable in a trunk of any vehicle. When it is necessary to mount the baggage carrier on the car, the case is removed, and in a matter of minutes the baggage carrier is unfolded and mounted on the roof of any car. After baggage transportation the baggage carrier is removed easily and fast, collapsed, placed into the case and stored in the trunk.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a plan view of a baggage carrier in accordance with the present invention, mounted on a car;

FIG. 2 is a view from the left of the baggage carrier in a closed condition;

FIG. 3 is a view from the right showing mounting and fixation of the baggage carrier on the two-door car;

FIG. 4 is a view from the left with mounting of soft side limiting element;

FIG. 5 is a view showing a transverse cross-section with mounting on a body of an old type;

FIG. $5^I$ is a view corresponding to the view of FIG. 5 but showing the mounting on the body of a new type;

FIG. 6 is a plan view with a support composed of soft ropes;

FIG. 7 is a side view showing a corner of a frame of the baggage carrier with connecting elements;

FIG. $7^I$ is a plan view of FIG. 7;

FIG. $7^{II}$ is an end view of FIG. 7;

FIGS. $7^{III}$ and $7^{IV}$ are views showing sections of FIGS. $7^I$ and $7^{II}$;

FIG. 8 is a transverse cross-section of the left part of the frame in folded condition;

FIG. 9 is a supporting unit of the frame of the baggage carrier on a side view;

FIG. 10 is a section of the unit of FIG. 9 with passing of belts through a slot in the frame;

FIG. 11 is a view showing a portion of the right part of the frame on a plan view with the supporting and fixing units;

FIGS. 12 and $12^I$ are views showing a side view and a plan view of the fixing unit of the baggage carrier in assembled condition;

FIGS. 13 and $13^I$ are a side view, and end view and a plan view of a pin and its mounting on the end of the fixing belt;

FIGS. 14 and $14^I$ are a side view and an front view of two modifications of an element for engaging a roof edge and car end edge;

FIG. 15 is a view showing a unit of engagement of the car end edge in a section;

FIG. 16 is a plan view of the baggage carrier which is being folded;

FIG. 17 is an end view of the folded baggage carrier;

FIG. 18 is a view showing a case with the folded baggage carrier.

DESCRIPTION OF THE PREFERRED EMBODIMENTS

A main frame of a baggage carrier in accordance with the present invention has four main elements, including two downwardly bent longitudinal elements and two straight transverse elements. The elements can be composed for example from an angled steel, they are hingably connected with one another at the corners, and operate in the same plane. Two connections of the elements are releasable and two other connections are non-releasable. In order to provide a connection, the bent ends of the elements 1 and $1^I$ are provided with welded plates 3 and 4 so as to form a box-shaped structure in the hinge area. Portions of angled members 5 and $5^I$ are welded to the ends of elements 2 and $2^I$, also to impart the shape of the box. In assembled condition in two corners of the frame turning axles are passed through vertical openings and welded. In two other corners pins 6 connected with the ropes are passed as shown in FIG. 7. Hooks 7 are welded to the frame elements from its lower side and used for fixing the ropes as shown in FIGS. 8, 2, 3.

In order to form a baggage support or a basket, elastic belts for example composed of nylon can be connected with one another to form a net and fixed to the sides of the elements 1 and $1^I$, see FIGS. 1, 2, 3, 5, 9. When the belts are stretchable, the basket can be formed by multiple passing of the belts through openings in the side elements of the frame, as shown in FIGS. 6, 7, 10.

The frame is supported on four special support units. Each support unit includes bars 9 composed for example of wood, metal caps 10 and hollow conical supports 11 composed for example of rubber. All elements of the support unit are connected with the frame by special pins with counter nuts extending through it, as shown in FIGS. 9 and 10. The elasticity of the rubber supports provides for a tight standing of the supports on a surface of any curvature, uniform transfer of the load from the baggage carrier, and also dampening of any horizontal loads due to its frictional properties.

Placing and fixing of the baggage carrier on the roof of any car is performed from four sides. Each side is provided with a fixing unit shown in FIG. 2. In each fixing unit a turnable eye 12 is fixed to the lower part of the elements 1 and 1' and has an opening for an elastic belt 13. A roller composed of a pipe which is placed on a partition for rolling the belt during tightening is arranged before the opening. Both ends of the belt pass through a fixator 14 formed as a throughgoing box. In the upper part the box has an opening with a thread, for a bolt with a wing. On the end of the bolt inside the box, a turnable convex disc is located. At the lower side the box has a circular opening, into which paired belts clamped by the disc are introduced, for a reliable fixation of the tensioned free end of the belt 13.

In the lower end of the frame, a supporting insert 15 is inserted and sewn. It has a pin with a head extending outside as shown in FIG. 13. Legs of catches 16 and 17 are placed on the head of the pin and have special openings for this as shown in FIG. 14.

In order to place and fix the baggage carrier on the roof of a four-door car, the legs of the catch 16 can be used so that they engage with the edge of the roof above the door openings of the car as shown in FIGS. 3, 5, 5'. For two-door cars, the front units of fixation can use the leg of catch 16 so that they engage the edge of the roof. The rear units of fixation can engage the edge of a wheel opening in the rear wing of the car body. Also, the leg of catch 17 with an inner rubber coating can be used at this location as shown in FIGS. 3, 14 and 15. The fixing units with the eyes 12 to be used in cars of different types can turn by 90°, as shown with the arrows in FIGS. 6 and 11. When it is necessary to provide side boards on the baggage carrier frame, the side boards can be composed of the same belts which pass through eyes formed at the corners of the frame, for example by means of rods 8 which are welded to the plates 3 and 4 as shown in FIG. 7. After placement of a luggage, the belts which pass from the rear corner to the front corner and back can be tightened and tied up as shown in FIG. 4.

In order to fold the inventive baggage carrier, the pins 6 from two corners of its frame are removed. Then elements 2 and 2' are turned inwardly and the frame is folded in a transverse direction as shown in FIG. 16. In the folded condition the baggage carrier is very compact as can be seen in FIG. 17, and it is placed into a special soft case in order to be stored in a car trunk or other place as shown in FIG. 18. Unfolding of the baggage carrier is performed in a reverse order, on any surface with subsequent placement and fixation of the unfolded baggage carrier on the roof of any car.

It will be understood that each of the elements described above, or two or more together, may also find a useful application in other types of constructions differing from the types described above.

While the invention has been illustrated and described as embodied in a baggage carrier for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A foldable vehicle baggage carrier, comprising a baggage support; a main frame arranged so as to support said baggage support on a car roof; means for fixing said main frame on a car roof, said main frame having two elongated elements connected with one another so that said frame is a substantially rectangular frame, said elements including two first elements located opposite to one another and each having a first end and a second end and two second elements also located opposite to one another and each having a first end and a second end, said first ends of said first elements being pivotally connected with said first ends of said second elements so that said second elements can be turned relative to said first elements inwardly of said rectangular frame, each of said second ends of said first elements being provided with two plates spaced vertically from one another so as to form a box-shaped structure, and each of said second ends of said second elements being insertable into said box-shaped structure and fixable in the latter; and means for fixing said second ends of said second elements into said box-shaped structures of said first elements, said fixing means including a plurality of bars, a plurality of metal caps, and a plurality of hollow conical supports composed of an elastic material and arranged so that said bars rest on said hollow conical support with interposition of said metal caps.

2. A vehicle baggage carrier as defined in claim 1; and further comprising means for connecting one of said bars with one of said metal caps and one of said hollow conical supports and including a pin extending through one of said bars, metal caps and hollow conical supports and provided with a counter nut.

3. A foldable vehicle baggage carrier as defined in claim 1, wherein said fixing means includes corner pins fixing said second ends of said second elements in said box-shaped structure of said second ends of said first elements.

4. A foldable vehicle baggage carrier as defined in claim 1, wherein said means for fixing said main frame on the car roof includes at least two eyes which are turnably connected to said first elements and elastic belts connected with said turnable eyes and provided with catches engageable with an edge of the roof.

5. A vehicle baggage carrier as defined in claim 4; and further comprising a fixator formed as a throughgoing box through which each of said belts passes, said throughgoing box having an upper part provided with a threaded opening; a turnable convex disc provided in said box on an end of a respective one of said bolts; and a bolt provided with a wing and screwable into said threaded opening of said upper part of said box for fixing said belt.

6. A foldable vehicle baggage carrier as defined in claim 1, and further comprising a case for storing said main frame and said baggage support in a collapsed condition.

7. A foldable vehicle baggage carrier, comprising a baggage support; a main frame arranged so as to support said baggage support on a car roof; means for fixing said main frame on a car roof, said main frame having two elongated elements connected with one another so that said frame is a substantially rectangular frame, said elements including two first elements located opposite to one another and each having a first end and a second end and two second elements also located opposite to one another and each having a first end and a second end, said first ends of said first elements being pivotally connected with said first ends of said second elements so that said second elements can be turned relative to said first elements inwardly of said rectangular frame, each of said second ends of said first elements being provided with two plates spaced vertically from one another so as to form a box-shaped structure, and each of said second ends of said second elements being insertable into said box-shaped structure and fixable in the latter; and means for fixing said second ends of said second elements into said box-shaped structures of said first elements, said first elements, in a mounted condition of the carrier, being longitudinal elements which are bent and whose first and second ends are upper ends located above a remaining portion of each of said longitudinal elements, said second elements being transverse elements which are straight and releasably connect said upper ends of said first elements with one another.

\* \* \* \* \*